March 21, 1933.  E. E. WICKERSHAM  1,902,430
HARVESTER
Filed April 24, 1928   2 Sheets-Sheet 1
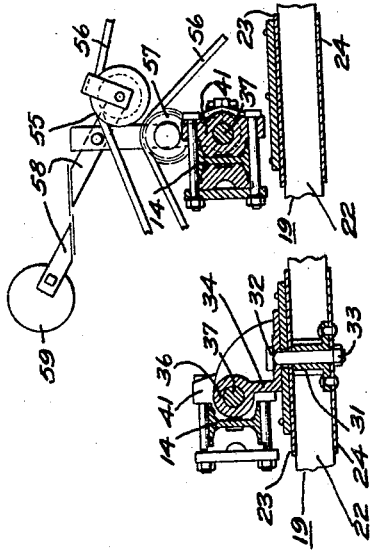
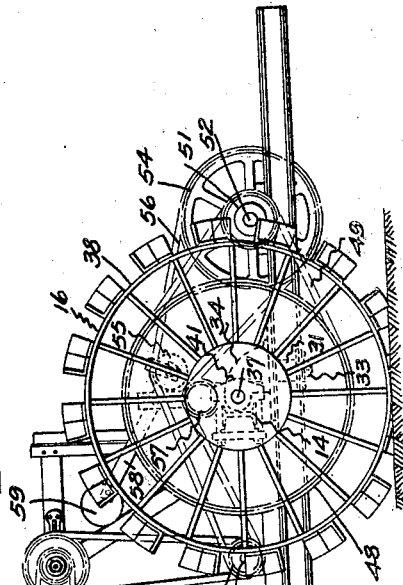
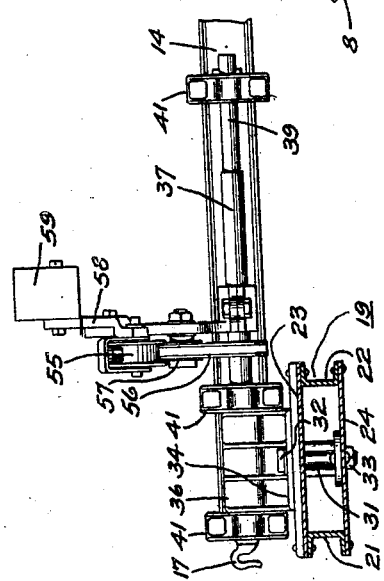
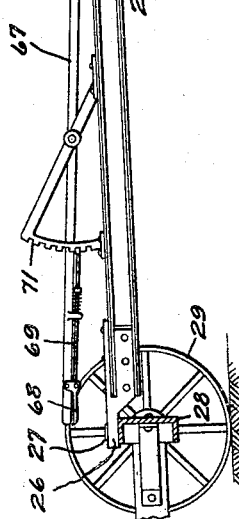
INVENTOR
Elmer E. Wickersham
BY
White, Prost & Fryer
ATTORNEYS

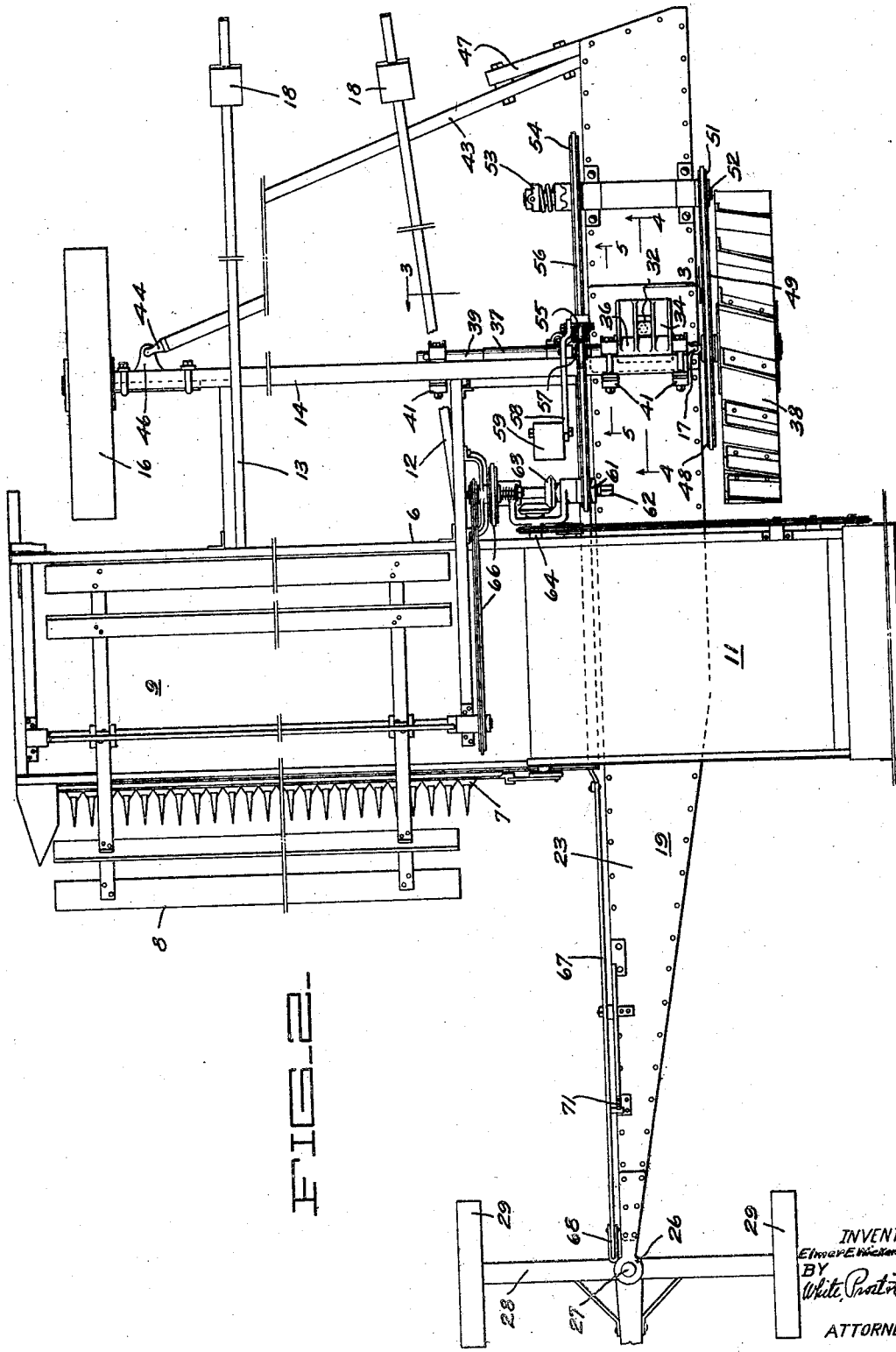

Patented Mar. 21, 1933

1,902,430

UNITED STATES PATENT OFFICE

ELMER E. WICKERSHAM, OF SAN LEANDRO, CALIFORNIA, ASSIGNOR, BY MESNE ASSIGNMENTS, TO CATERPILLAR TRACTOR CO., OF SAN LEANDRO, CALIFORNIA, A CORPORATION OF CALIFORNIA

HARVESTER

Application filed April 24, 1928. Serial No. 272,435.

My invention relates to vehicles primarily adapted to be utilized in conjunction with a standard header usually forming one unit of a combined harvester. It is not always advisable in harvesting grain, to cut the grain and immediately pass it thru a separating or threshing mechanism, as is mandatory when such combined harvesters are used. It is often expedient to cut the standing grain and, instead of threshing it at once, to leave it lying in the field in windrows in order to dry or cure. While the header unit of a combined harvester is capable of cutting grain and conveying it into the separator unit of the harvester, it is incapable, ordinarily, of any other use.

It is therefore an object of my invention to provide a device which will render the header unit of an ordinary combined harvester capable of cutting standing grain and discharging it onto the ground to lie in windrows.

Another object of my invention is to provide a windrow header which is able to withstand the jolts and jars to which such a machine is subjected when being driven over a grain field.

Another object of my invention is to provide means for making the attachment of my invention individually portable without employing a number of extra parts.

The foregoing and other objects are attained in the embodiment of the invention shown in the drawings, in which Fig. 1 is a side elevation of the windrow header of my invention joined with a standard header from a combined harvester.

Fig. 2 is a plan of the machine shown in Fig. 1.

Fig. 3 is a transverse section of the machine, the plane of section being indicated by line 3—3 of Fig. 2.

Fig. 4 is a detail showing in cross section the mechanism adjacent the pivotal connection between the frame and the stub axle, the plane of section being indicated by line 4—4 of Fig. 2.

Fig. 5 is a cross section thru the axle, the plane of section being indicated by line 5—5 of Fig. 2.

In its preferred form, the windrow header of my invention preferably includes a frame suitably supported on one or more ground wheels and connected for limited universal movement to a stub axle adapted to be lashed or otherwise fastened to the axle of a standard header.

Although my windrow header can be built as a complete, unitary machine, I preferably construct it to include the header unit of a standard combined harvester. Such a header unit preferably comprises a framework 6 carrying at its forward or leading edge a conventional sickle 7 for cutting the standing grain as the header is advanced thereinto. To direct the grain as it is cut by the sickle, a reel 8 is mounted on the framework 6 and is suitably revolved to discharge the cut grain onto a draper 9. The grain is conveyed along the draper and up a spout 11 which forms a portion of the header.

To support the cutting and conveying mechanisms, the framework 6 is customarily provided with a pair of balance beams 12 and 13, respectively, which extend rearwardly of the rest of the header. They are fulcrumed about a header axle 14 carrying at its outer end a header wheel 16 and at its inner end usually provided with a hook 17 adapted to be inserted into a suitable eyelet on the separator portion of the harvester, not shown. The trailing ends of the balance beams 12 and 13 carry counterweights 18 which are suitably adjusted so that the entire header balances nicely on the axle 14.

In order to provide means for supporting the header and to adapt the header unit to be propelled over the field without being attached to the cumbersome separator unit, I provide a carriage. Included in the carriage is a frame 19 which, in distinction to the frames of various machines which have preceded this one, is extremely rigid. To gain the desired rigidity without sacrificing light weight, I preferably construct the frame of a pair of channel irons 21 and 22 placed back to back and joined by an upper plate 23 and a lower plate 24. These plates can be suitably fastened to the channels by rivets or by removable nuts and bolts. At its forward end, the frame 19 is preferably tapered to terminate in a journal 26 receiving a pivot pin 27 for connecting the frame to a front axle 28 and supporting wheels 29. The journal 26 provides an attachment for draft mechanism, such as the wheels shown, or for draw bar connection to a tractor.

At a suitable point in the length of the frame 19 to insure good balance of the carriage, there is provided means for attaching the carriage to the header unit 6. This attaching means is of special design to permit considerable relative movement between the header and the carriage. Strains originating in either unit are thus neutralized and the possibility of the units weaving and bucking each other is precluded. Intermediate the upper plate 23 and the lower plate 24, I preferably provide a spacer 31 which is suitably bolted or riveted in place. The spacer is formed with a passage for a thru bolt 32 held by a nut 33 and acting as a pivot for a body 34 situated above the upper plate 23. Usually this connection between the body 34 and the frame 19 is loose to permit a limited universal movement therebetween. The body 34 at its forward face is provided with an apertured boss 36 to receive a stub axle 37.

At one end of axle 37 is a bull wheel 38 freely journaled thereon which not only provides support for the frame 19 but also furnishes motive power to the various moving elements of the combined machine as will hereinafter appear. The other end of the stub axle 37 is preferably machined, as at 39, to provide an alternative mounting for the ground wheel 16. This is for the purpose of transporting the carriage 19 when it is detached from the header. Inasmuch as the header unit is normally transported from job to job on a carrying truck or dolly, the wheel 16 is customarily detached from the axle 14. By providing a seat on the stub axle 37 for the detached wheel 16, I have afforded a carriage which is individually portable.

The inner end of the axle 14 and a portion of the weight of the header are supported by being connected to the stub axle 37. The connection is conveniently effected by placing the two axles in side by side relationship and lashing them together. Clamps 41 are placed about the stub axle and the header axle and preferably conform to the contour of the juxtaposed parts. This is particularly illustrated in Figs. 4 and 5. When the two axles are lashed together they are rigidly connected, but the loose pivotal joint 32 affords a limited universal movement between the header and carriage units.

In order to provide a firm driving connection but at the same time avoid impairing the flexibility of the vehicle, I attach a push pole 43, having a hook 44 at its outer end to an eyelet 46 located at the wheel end of the header axle 14. In distinction to the usual manner of fastening a push pole at its inner end by a hook engaging an eyelet in the separator unit of a combined harvester, I preferably pierce the inner end of the push pole 43 and bolt it securely to an extension 47 projecting from the rear end of the frame 19. In this manner the push pole 43 insures a firm driving connection between the carriage and the header but at the same time is sufficiently yielding and resilient to permit a limited amount of relative movement.

The drive for the various units in the machine is preferably derived from the bull wheel 38, although a source of power, such as an internal combustion engine, can readily be mounted on the platform provided by the upper plate 23 of the carriage. With the usual arrangement, the drive originates with the bull wheel which turns in conjunction with a bull gear 48. By means of a chain 49 the bull gear rotates a pinion 51 on the end of a cross shaft 52 suitably journaled on the framework 19 and driving a gear 54 thru an overload clutch 53. A chain 56 which encompasses the gear 54 passes upwardly over the joined axles 14 and 37 and is guided by idlers 55 and 57. Preferably the idler 55 is mounted on a pivoted arm 58 carrying a counterweight 59 at its opposite end to insure correct chain tension. The chain 56 loops about a sprocket 61 installed on the end of the drive shaft 62 which normally is connected thru a slip joint to the source of power provided on the thresher unit of a combined harvester. The drive from this point is conventional, being thru bevel gears 63 and a cross shaft 64 to the sickle 7 and thru chains 66 to the reel 8.

To replace the Jacob staff ordinarily provided on the thresher unit of a combined harvester for regulating the height of the header, a lever 67 is suitably pivoted to the frame 19 and connects at its rear end to the framework 6. The forward end of the lever is provided with a handle 68 for manual control and is retained in position by a latching means 69 cooperating with a sector 71 disposed on the upper plate 23.

Largely because of the rigid construction of the carriage, there is practically no weaving or bending thruout its entire length, and since the connection between the supporting carriage and the header unit is flexible, there are no excessive strains transferred between the units. The result of my construction is to afford a windrow header that will withstand a large amount of severe handling and abuse in the field without necessitating a heavy construction or a construction expensive to manufacture and maintain.

It is to be understood that I do not limit myself to the form of windrow header shown and described herein, as the invention, as set forth in the following claims may be embodied in a plurality of forms.

I claim:

1. A windrow header comprising a box frame including a pair of beams joined substantially thruout their length by upper and lower plates, a body loosely pivoted to said frame, and means for fastening the axle of a standard header at a plurality of points to said body.

2. A windrow header comprising a frame, a body connected to said frame for limited universal movement, a stub axle secured to said body, and means for fastening the axle of a standard header to said stub axle.

3. A windrow header comprising a standard header having an axle with a supporting wheel at one end thereof, a stub axle fastened to the other end of said axle, a supporting wheel on said stub axle, a body fastened to said axles intermediate said wheels, a frame connected to said body for limited movement relative to said fastened axles, and a draft connection on said frame.

4. A windrow header comprising a frame, wheels for supporting said frame, a standard header having an axle with a supporting wheel at one end thereof, a stub axle mounted on said frame, means on said stub axle for receiving said header supporting wheel, and alternatively operable means for securing said header axle to said stub axle.

5. A windrow header comprising a rigid frame, a stub axle having a wheel thereon, a standard header having an axle with a supporting wheel at one end thereof, means for rigidly joining together both of said axles to provide a carriage for said header, and means for mounting said joined axles on said frame to provide for a limited pivotal movement between said joined axles and said frame.

6. A windrow header comprising a rigid frame, wheels for supporting said frame, means for rigidly supporting both of said wheels, a standard header carried by said supporting means, and means for joining said supporting means to said frame for a limited pivotal movement between said supporting means and said frame.

7. A windrow header comprising a rigid frame, a standard header having an axle with a supporting wheel thereon, a stub axle with a wheel at one end thereof, and means for joining said axles securely together for a limited pivotal movement with respect to said frame.

8. In a harvester, a carriage comprising supporting and driving means for a header only and a header detachably supported for limited movement relative to said carriage and driven thereby.

9. In a harvester; a header unit comprising a frame, a ground support therefor, and grain handling mechanism carried thereby; a carriage unit comprising a frame and a ground support therefor; and means to connect said header unit to said carriage unit for limited movement with respect thereto, or to a thresher unit.

10. In a harvester; a header unit as an independent article of manufacture and comprising a frame, a ground support therefor, and grain handling mechanism carried thereby; a carriage unit as an independent article of manufacture and comprising a frame and a ground support therefor; and detachable means connecting said units for limited movement therebetween, said latter connection including means on the header for attachment to a thresher unit.

11. In a harvester, a windrow machine comprising a header unit including a frame and means supported by said frame for optional and detachable connection to a thresher unit, a carriage unit, and means forming a detachable connection between said header unit and said carriage unit, said latter connection including means allowing movement of the header unit relative to the carriage unit.

12. A windrow machine comprising a carriage unit, a header unit, said header unit including a shaft, and means on the carriage unit for movably connecting the shaft thereto.

13. A windrow machine comprising a carriage unit, a header unit, said header unit including a shaft and a ground engaging member mounted at one end of the shaft, and means on the carriage unit for movably connecting the other end of the shaft thereto.

14. A windrow machine comprising a carriage unit, a header unit, said header unit including an axle and said carriage unit including an axle movably mounted thereon, and means for uniting said axles.

15. A windrow machine comprising a carriage unit, a header unit, said header unit including an axle and said carriage unit including an axle movably mounted thereon, and means for lashing said axles together.

16. A windrow machine comprising a carriage unit, a header unit, said header unit including a shaft, means on the carriage unit for movably connecting the shaft thereto, and a push pole rigidly connected to one of said units and loosely connected to the other of said units.

17. In a harvester, a detachable header unit including a shaft, a detachable carriage unit including a shaft movably mounted thereon, and detachable means connecting said shafts to provide a windrow machine.

18. In a harvester, a carriage unit as an independent article of manufacture, and means on said carriage unit for detachable connection to a header unit to provide a windrow machine, said means including a connecting member movably mounted on said carriage unit.

19. A windrow machine comprising a header unit including an axle and a ground-engaging member thereon; a carriage unit including a frame extending transversely of the axle and a ground-engaging member therefor, said frame being positioned between said ground-engaging members; and means connecting said axle to said frame for movement relative thereto.

20. A windrow machine comprising a header unit including an axle and a ground-engaging member thereon; a carriage unit including a rigid frame extending transversely of the axle, a second axle movably mounted on said frame, and a ground-engaging member mounted on said second axle, said frame being positioned between said ground-engaging members; and means rigidly uniting said axles.

21. A windrow machine comprising a header unit, a rigid main supporting body therefor extending forwardly and rearwardly transversely of the header unit, and spaced wheels for the machine between which the body is positioned.

22. A windrow machine comprising a header unit having a draper, a main supporting body for the header unit and extending forwardly and rearwardly transversely of the draper, an axle on the header, an axle on the body, means connecting said axles, and a wheel on each axle between which the body is positioned.

In testimony whereof, I have hereunto set my hand.

ELMER E. WICKERSHAM.